United States Patent Office 3,578,715
Patented May 11, 1971

3,578,715
NOVEL DIKETONES AND DERIVATIVES THEREOF
Bernard Pierre Corbier and Paul Jose Teisseire, Grasse, France, assignors to S.A. des Etablissements Roure-Bertrand Fils & Justin Dupont, Grasse, France
No Drawing. Filed Oct. 10, 1966, Ser. No. 585,259
Claims priority, application Switzerland, Oct. 14, 1965, 14,216/65
Int. Cl. C07c 49/30
U.S. Cl. 260—586  3 Claims

ABSTRACT OF THE DISCLOSURE

Novel diketones, illustrative of which are lower enolethers such as those of the formula

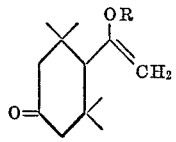

where R represents a lower alkyl group, and process for preparing the same wherein certain particular intermediate ketones are reacted with lower alkylorthoformates in the presence of an acid catalyst.

---

This invention relates to novel diketones of the general formula

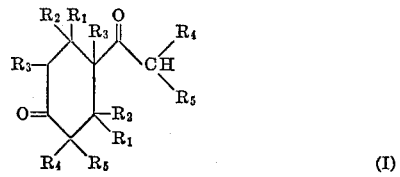

their lower enolethers, enolesters or ketals and to a process for the preparation thereof. In general Formula I, $R_1$ and $R_2$ represent lower alkyl or cyclo lower alkyl groups or, together a lower alkylene group, preferably containing up to 5 carbon atoms, such as methyl, ethyl, propyl, butyl, cyclo propyl, tetramethylene or pentamethylene, whilst $R_3$, $R_4$ and $R_5$ represent hydrogen atoms or lower alkyl groups, for example those containing 1 to 5 carbon atoms, such as methyl, ethyl, propyl, butyl. The aforementioned lower enolethers, enolesters or ketals may, for example contain 1 to 5 carbon atoms in the ether or ester or ketal groups.

The compounds of Formula I, their enolethers, enolesters and ketals are distinguished by interesting odors, woody odors in particular, and accordingly are suitable for use as odorants, for example in perfumes, soaps, detergents, cleansing agents and other scented compositions.

The process according to the invention comprises reacting a ketone of the general formula

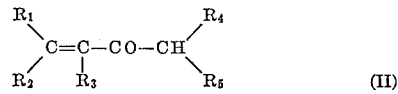

in which $R_1$–$R_5$ are as defined above, with a lower alkyl orthoformate in the presence of an acid catalyst and, if desired, subjecting the reaction product to hydrolysis, ketalisation, enol etherification or enol esterification.

The α,β-unsaturated ketones of Formula II used as starting materials are to a large extent known compounds such as the mesityl oxide for example, and can be obtained by methods known per se by condensing two ketones which may be identical or different. For example, the mesityl oxide can be obtained from acetone by autocondensation. Other typical starting compounds of Formula II are, for example, those in which $R_1$ and $R_2$ represent ethyl groups whilst $R_3$ to $R_5$ represent hydrogen atoms, or those in which $R_1$ is an ethyl group, $R_2$ a methyl group and $R_3$ to $R_5$ hydrogen atoms.

The alkyl group of the aforementioned alkyl orthoformate is preferably a lower primary alkyl group with 1 to 5 carbon atoms, such as methyl, ethyl, n-propyl, butyl, isobutyl, amyl or isoamyl. Suitable acid catalysts are, for example Lewis acids such as boron trifluoride etherate.

Reaction of the ketone corresponding to Formula II with the alkylorthoformate generally yields a mixture of several enolethers which are distinguished by the different positions of the enolether group. For example the enolether group can be present in the side chain, as is the case with monoenolethers corresponding to the general formula

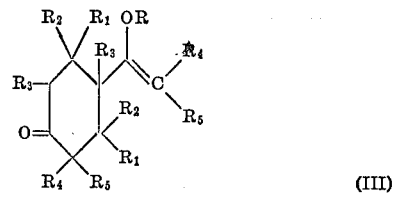

in which R represents a lower alkyl group, in particular a primary alkyl group with 1 to 5 carbon atoms, whilst $R_1$ to $R_5$ are as defined above.

On the other hand, the enolether group may also be present in the ring, as is the case with monoenolethers corresponding to the general formula

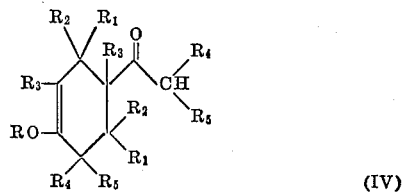

in which R and $R_1$–$R_5$ are as defined above.

Finally, enolether groups may be present both in the side chain and in the ring, as is the case with bis-enolethers corresponding to the general formula

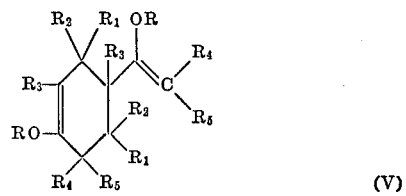

in which R and $R_1$–$R_5$ are as defined above.

The quantitative proportion of these various enolethers is governed both by the reaction conditions and above all by the quantities in which the two starting components are used. In cases where the ketone corresponding to Formula II is used in a large excess in relation to the alkylorthoformate, the monoenolethers of Formula III will mostly be obtained. If on the other hand the two starting components are used in approximately equimolar quantities, the bis-enolethers of Formula V will mostly be obtained.

The reaction products can be isolated from the reaction mixture by conventional methods, for example by repeated fractional distillation. Completely pure products can be obtained by chromatography for example.

The resulting enolethers of Formula III, IV or V can be converted into the corresponding diketones of Formula I by hydrolysis, preferably acid hydrolysis.

If, for example, enolethers corresponding to the formulae

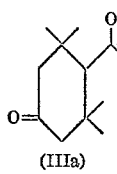 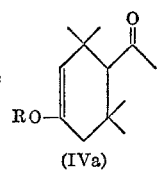 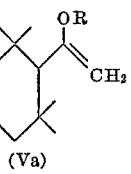
(IIIa)　　　　(IVa)　　　　(Va)

in which R is as defined above, are subjected to the action of dilute hydrochloric acid at room temperature, 4-acetyl-3,3,5,5-tetramethylcyclohexanone is formed, i.e. the diketone corresponding to the formula

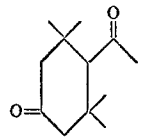
(Ia)

The diketones thus obtained can be ketalised by methods known per se, for example by reaction with a lower alkylene glycol such as ethylene or propylene glycol, in the presence of an acid agent. It is possible in this way to obtain monoketals corresponding to the general formula

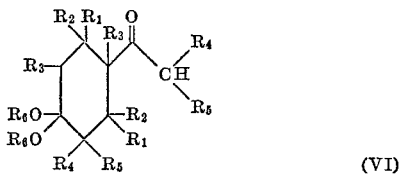
(VI)

in which the two symbols R each represent a lower alkyl group, preferably containing 1 to 4 carbon atoms, or together represent a lower alkylene group, preferably containing 2 to 4 carbon atoms, whilst the symbols $R_1$ to $R_5$ are as defined above.

For example, it is possible to obtain from the diketone of Formula Ia ketals corresponding to the general formula

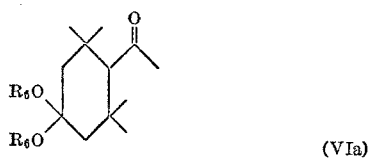
(VIa)

in which R is a defined above, for example 4-acetyl-1,1-dimethoxy-3,3,5,5-tetramethylcyclohexane or 4-acetyl-1,1-ethylenedioxy-3,3,5,5-tetramethylcyclohexane.

The diketones of Formula I can also be converted by methods known per se into the corresponding enolethers or enolesters. For example, conversion into an enolether can be effected by reaction with a lower alkylorthoformate such as methyl- or ethyl-orthoformate, in the presence of a Lewis acid such as boron trifluoride etherate. For conversion into an enol ester, for example into 1-acetoxy-4-acetyl-3,3,5,5-tetramethylcyclo-1-hexene, the aforementioned diketone can be reacted with a conventional esterifying agent, for example with a functional derivative of a lower alkane carboxylic acid, for example with an anhydride or an ester of such an acid, for example with isopropenyl acetate.

The following compounds for example are characterised by their distinctive odors:

The monoethylenolether corresponding to the formula

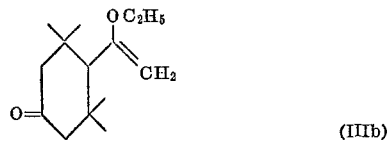
(IIIb)

i.e. 4 - (1-ethoxyvinyl)-3,3,5,5-tetramethylcyclohexanone, has a woody odor accompanied by an animal flavor.

The bis-ethylenolether corresponding to the formula

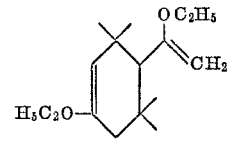
(Vb)

i.e. 1 - ethoxy-4-(1-ethoxyvinyl)-3,3,5,5-tetramethylcyclo-1-hexene, has a pleasant woody smell.

The monoethylenolether corresponding to the formula

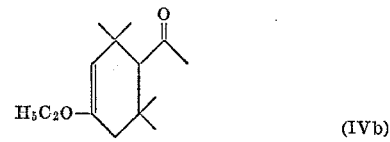
(IVb)

i.e. 1 - ethoxy-4-acetyl-3,3,5,5-tetramethylcyclo-1-hexene has a highly refined, woody smell, as has the ethylene ketal corresponding to the formula

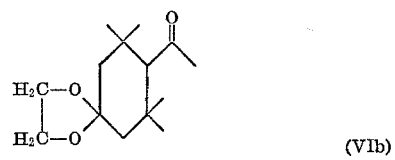
(VIb)

i.e. 4-acetyl - 1,1 - ethylenedioxy-3,3,5,5-tetramethylcyclohexane.

In the following examples, the temperatures are given in degrees centigrade (° C.).

EXAMPLE 1

1 ml. of boron trifluoride etherate is added to 490 g. (5 mols) of mesityl oxide. The temperature of the reaction mixture is increased to 50°, 148 g. (1 mol) of ethylorthoformate being added to it over a period of 4 hours. The temperature is kept at 50° for 4 hours, after which 5 g. of powdered sodium carbonate are added and the mixture stirred for 30 minutes. The resulting product is washed once with 100 ml. of a 10% sodium carbonate solution and twice with 100 ml. of a 30% brine solution. A mixture of ethyl alcohol, ethyl formate and excess mesityl oxide is obtained by distillation at normal pressure. Rectification yields approximately 70 g. of a mixture boiling between 75–84°, from which 4-(1-ethoxyvinyl)-3,3,5,5-tetramethylcyclohexanone (cf. Formula IIIb) can be isolated. Boiling point: 80–82°/2 mm.; $n_D^{15}$: 1.4758; carbonyl index: 245 (theoretical value for one function= 250).

EXAMPLE 2

1 ml. of boron trifluoride etherate is added to 117.6 g. (1.2 mols) of mesityl oxide. The temperature of the reaction mixture is increased to 50°, 148 g. (1 mol) of ethylorthoformate being added to it over a period of 2 hours. The temperature is kept at 30° for 24 hours, after which the reaction mixture is worked up as described in Example 1. The following compounds are obtained as the main products in practically the same quantities:

(a) 1-ethoxy-4-(1-ethoxyvinyl)-3,3,5,5 - tetramethylcyclo-1-hexene (cf. Formula Vb); boiling point: 74–76°/ 2 mm.; $n_D^{25}$: 1.4744; carbonyl index: 220 (theoretical value for one function=222).

(b) the 4-(1-ethoxyvinyl)-3,3,5,5 - tetramethylcyclohexanone of Formula IIIb described in Example 1.

EXAMPLE 3

An enolether obtained in accordance with Example 1 or 2 is hydrolysed with 10 times its weight of 0.5% aqueous hydrochloric acid by stirring the mixture for 24 hours at room temperature (approx. 20–25°). In this way, 75 g. of crude product are obtained from 100 g. of starting product. It is purified by fractional distillation yielding 4-acetyl-3,3,5,5-tetramethylcyclohexanone (cf. Formula Ia). Boiling point: 108°/2 mm.; $n_D^{15}$: 1.4786.

EXAMPLE 4

1 mol of 4-acetyl-3,3,5,5-tetramethylcyclohexanone is reacted in benzene solution with 1 mol of ethylene glycol in the presence of p-toluene sulphonic acid. On completion of the reaction, the benzene solution is washed, 4-acetyl-1,1-ethylenedioxy-3,3,5,5 - tetramethylcyclohexane (cf. Formula VIb) being obtained in crystallised form following removal of the benzene. Melting point: 113–113.5°.

EXAMPLE 5

132.5 g. (1.25 mols) of methylorthoformate are added dropwise at 35±5° over a period of one hour to 196 g. (1 mol) of 4-acetyl-3,3,5,5-tetramethylcyclohexanone containing 1 ml. of boron trifluoride etherate. On completion of the addition, the reaction mixture is kept for another 24 hours at the aforementioned temperature. 8 g. of sodium carbonate are then added and the mixture stirred for 15 minutes, after which it is diluted with 1 litre of petroleum ether and washed in the usual way. Following repeated distillations, the following two compounds are obtained in a ratio of 1:4 in a total yield of approximately 80%:

(a) 4-acetyl-1-methoxy-3,3,5,5 - tetramethylcyclo - 1-hexene: boiling point: 78–80°/1 mm.; $n_D^{15}$: 1.4780.

(b) 4-acetyl-1,1-dimethoxy-3,3,5,5 - tetramethylcyclohexane; boiling point: 90–93°/1 mm.; Melting point: 59–60°.

Both these compounds have a pungent cork odor accompanied in the case of (b) by a distinct suggestion of caryophyllenol.

EXAMPLE 6

The following monoenolethers are similarly obtained:

4-acetyl-1-ethoxy-3,3,5,5-tetramethylcyclo - 1 - hexene; boiling point: 90°/1 mm.; $n_D^{15}$: 1.4745; this compound smells of cork and carnations, with a trace of geranium.

4-acetyl-1-n-propoxy-3,3,5,5-tetramethylcyclo - 1 - hexene; boiling point: 92°/0.4 mm.; $n_D^{15}$: 1.4749; this compound has a musty odor, reminiscent of patchouli.

4-acetyl-1-n-butoxy-3,3,5,5-tetramethylcyclo - 1 - hexene; boiling point 97–99°/0.44 mm.; $n_D^{15}$: 1.4735; this compound has a pungent, woody odor reminiscent of sandal wood, accompanied by a musty flavor.

4-acetyl-1-isobutoxy-3,3,5,5-tetramethylcyclo - 1 - hexene; boiling point 107–109°/0.5 mm.; $n_D^{15}$: 1.4712; this compound has a pungent, musty odor, reminiscent of patchouli.

4-acetyl-1-n-amyloxy-3,3,5,5-tetramethylcyclo-1 - hexene; boiling point 101–104/0.3 mm.; $n_D^{15}$: 1.4630; odor weaker than in the preceding examples, but of the same woody, musty flavor.

4-acetyl-1-isoamyloxy-3,3,5,5-tetramethylcyclo-1 - hexene; boiling point 106–108°/0.2 mm.; $n_D^{15}$: 1.4658; this compound has the same type of odor as the substances described above.

4-acetyl-1-allyloxy-3,3,5,5-tetramethylcyclo-1 - hexene; boiling point 95–100°/0.5 mm.; $n_D^{15}$: 1.4846; woody smell with a trace of carnations.

In addition, the corresponding ketals can be obtained, such as for example:

4-acetyl-1,1-diethoxy-3,3,5,5 - tetramethylcyclohexane; boiling point 104°/1 mm.; $n_D^{15}$: 1.4676.

4-acetyl-1,1-di-n-propoxy - 3,3,5,5 - tetramethylcyclohexane; boiling point 118°/0.4 mm.; $n_D^{15}$: 1.4676.

4-acetyl-1,1-di-n-butoxy-3,3,5,5 - tetramethylcyclohexane; boiling point 125–127°/0.4 mm.; $n_D^{15}$: 1.4662; weak, woody flavor.

4-acetyl-1,1-di-isobutoxy - 3,3,5,5 - tetramethylcyclohexane; boiling point 125–128°/0.5 mm.; melting point 48°.

EXAMPLE 7

1-acetoxy-4-acetyl-3,3,5,5-tetramethylcyclo - 1 - hexene (B.P. 92–94°/0.3 mm.; $n_D^{15}$: 1.4785) is obtained by reacting 4-acetyl-3,3,5,5-tetramethylcyclohexanone with iso-propenyl acetate. This compound is distinguished by its very refined, but slightly woody and amber-like odor.

EXAMPLE 8

Starting from mesityl oxide and methylorthoformate, the procedure described in Example 1 yields a mixture of substances boiling at 89–90/1 mm. (whose odor is the same as that of the corresponding mixture of Example 1), from which 4-(1-methoxyvinyl)-3,3,5,5-tetramethylcyclohexanone boiling at 90–92°/1 mm. (M.P. 45°) can be isolated.

It is possible by working under the reaction conditions of Example 2, starting from mesityl oxide and methylorthoformate, also to obtain the corresponding bis-enolether, i.e. 1-methoxy-4-(1-methoxyvinyl)-3,3,5,5 - tetramethylcyclo-1-hexane; boiling point 82–84°/mm., $n_D^{15}$: 1.4872.

EXAMPLE 9

Starting from mesityl oxide and n-propylorthoformate, the procedure described in Example 1 yields a mixture of the corresponding n-propylenolethers boiling at 95–100°/1 mm., $n_D^{15}$: 1.4795. Its odor is similar to that of the corresponding mixture of Example 1.

EXAMPLE 10

Starting from mesityl oxide and isobutylorthoformate, the procedure described in Example 1 yields a mixture of the corresponding isobutylenolethers boiling at 110–120°/1 mm.; $n_D^{15}$: 1.4775. Its odor is similar to that of the corresponding mixture of Example 1, although somewhat stronger.

EXAMPLE 11

Starting from mesityl oxide and isoamylorthoformate, the procedure described in Example 1 yields a mixture of the corresponding isoamylenolethers boiling at 110–120°/1 mm.; $n_D^{15}$: 1.4780. Its odor is similar to that of the corresponding mixture of Example 1, although slightly weaker.

EXAMPLE 12

Some odorant compositions containing a mixture of 4-(1-ethoxyvinyl)-3,3,5,5-tetramethylcyclohexanone (substance A) and 1 - ethoxy - 4 - (1-ethoxyvinyl)-3,3,5,5-cyclo-1-hexene (substance B), are described in the following:

| | Parts by weight |
|---|---|
| (a) Mixture of substances A and B | 100 |
| Benzyl salicylate | 200 |
| p-cresylacetate (10%) in diethyl phthalate | 10 |
| $C_{16}$-aldehyde in diethyl phthalate (10%) | 10 |
| Geraniol extra | 40 |
| Benzyl acetate | 50 |
| α-Ionone | 100 |
| Diethylacetophenone | 25 |
| Phenyl oxide | 10 |
| Linalyl acetate | 150 |
| Cinnamic alcohol | 30 |
| Coumarin | 50 |
| (b) Mixtures of substances A and B | 150 |
| Diisobutyl carbinol acetate | 200 |
| Eugenol extra | 50 |
| Methylnonyl acetaldehyde (10%) in diethyl phthalate | 30 |
| $C_{16}$-aldehyde (10%) in diethyl phthalate | 10 |
| Phenylethyl acetate | 30 |
| Amyl cinnamic aldehyde | 20 |
| Benzyl acetate | 40 |
| α-Ionone | 100 |
| Hydroxycitronellal | 70 |
| Geranium-Bourbon essence | 70 |
| Geraniol extra | 30 |
| Citronellol | 30 |
| Coumarin | 20 |

What is claimed is:
1. Lower enolethers of the general formula

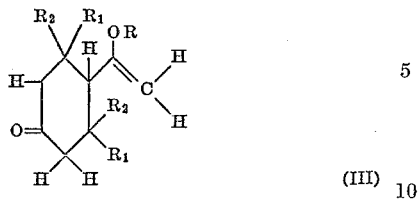 (III)

in which R represents a lower alkyl group, $R_1$ and $R_2$ represent lower alkyl.

2. Lower enolethers of the general formula

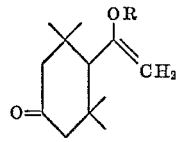

in which R represents a lower alkyl group.

3. 4 - (1 - ethoxyvinyl)-3,3,5,5-tetramethylcyclohexanone.

References Cited
Morita, Ken-Ichi, et al. J. Org. Chem. 30 (2) 533–538 (1965) (England).

BERNARD HELFIN, Primary Examiner

G. A. SCHWARTZ, Assistant Examiner

U.S. Cl. X.R.

260—340.9, 593, 611; 252—522